United States Patent

[11] 3,562,453

| [72] | Inventor | Sydney R. Crockett<br>Oxnard, Calif. |
| --- | --- | --- |
| [21] | Appl. No. | 883,079 |
| [22] | Filed | Dec. 8, 1969<br>Continuation-in-part of Ser. No. 779,330, Nov. 27, 1968. |
| [45] | Patented | Feb. 9, 1971 |
| [73] | Assignee | The United States of America as represented by the Secretary of the Navy |

[54] APOGEE SWITCH WITH MAGNETIC ACTUATOR
5 Claims, 8 Drawing Figs.

| [52] | U.S. Cl. | 200/61.45 |
| --- | --- | --- |
| [51] | Int. Cl. | H01h 35/14 |
| [50] | Field of Search | 200/61.45, 61.53 |

[56] References Cited
UNITED STATES PATENTS

| 2,890,303 | 6/1959 | Clurman | 200/61.45 |
| 2,982,213 | 5/1961 | Meschino et al. | 102/70.2 |
| 3,354,713 | 11/1967 | Sneed et al. | 73/170 |

*Primary Examiner*—Robert K. Schaefer
*Assistant Examiner*—M. Ginsburg
*Attorneys*—Richard S. Sciascia, Q. Baxter Warner and Garward N. Mann ABSTRACT: A switch responsive to conditions which occur when a missile reaches apogee. It includes a cylinder provided with a movable weight having a cage at one end in which a conductive sphere is locked prior to launch. Some time after launch a decrease in acceleration unlocks the cage. At apogee the sphere being free of the cage is attracted by magnetism to a ring contact encircling the plunger which closes an electrical circuit.

PATENTED FEB 9 1971
3,562,453
SHEET 1 OF 2
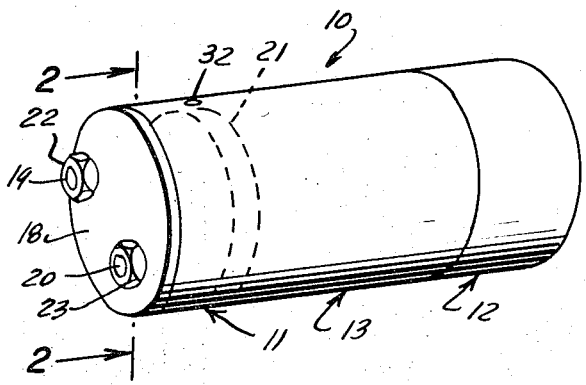
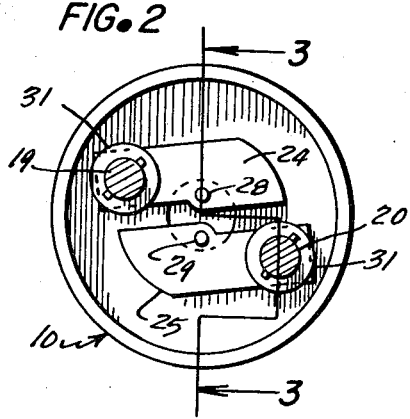
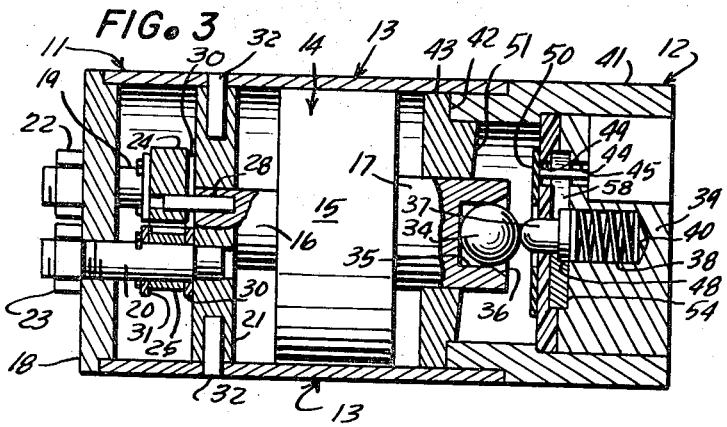
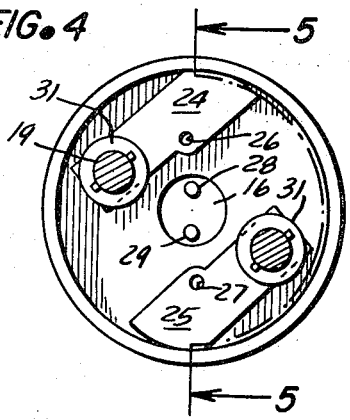
Sydney R. Crockett
INVENTOR
By Gayward N. Mann
Q. Baxter Warner
Attorneys

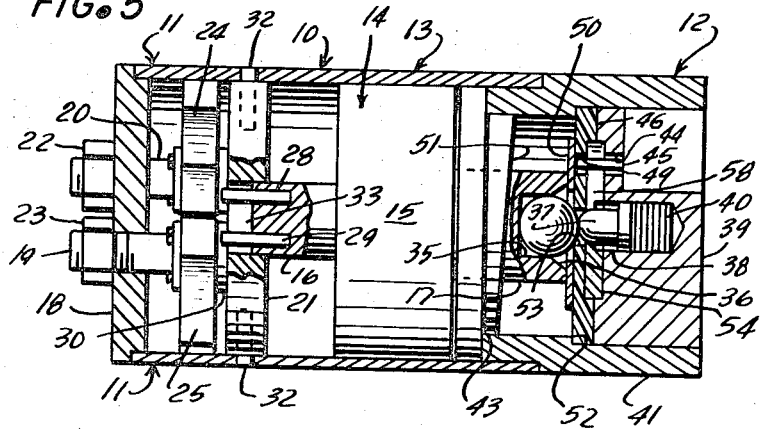
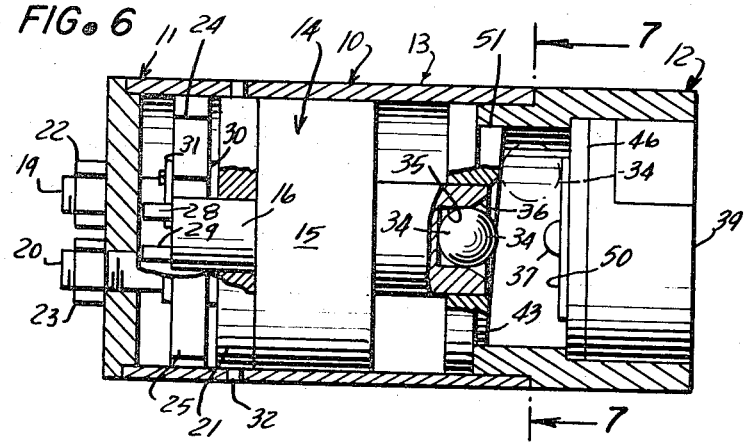
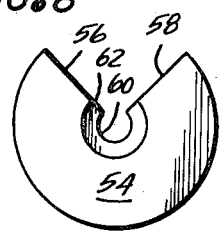
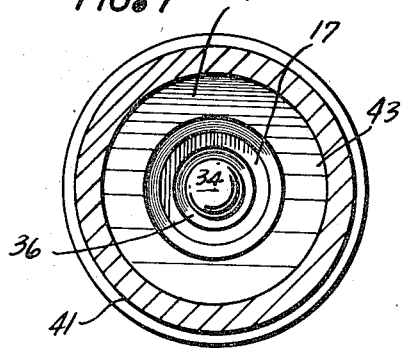
Sydney R. Crockett
INVENTOR

APOGEE SWITCH WITH MAGNETIC ACTUATOR

CROSS REFERENCES TO RELATED APPLICATIONS

This application is a continuation-in-part of application Ser. No. 779,330 filed Nov. 27, 1968, now U.S. Pat. No. 3,501,604 issued Mar. 17, 1970.

BACKGROUND OF THE INVENTION

1. Field of the Invention

The present invention relates to switches or indicators and more particularly to such a device which is activated at the time a missile reaches the apogee point of its flight path.

2. Description of the Prior Art

In recent years meteorological probes or sounding rockets have become a principal means of obtaining information relative to the upper atmosphere. For example, at apogee a rocket powered probe may be programmed to eject an instrument payload or take a reading or to perform any other scientific function. However, in carrying out such function a suitable means of accurately determining the rocket apogee is necessary or the instruments mounted within the rocket may record information at less than the maximum altitude. Former methods were not entirely satisfactory since they had to be preset before missile launch to operate after an estimated time interval and necessarily could not anticipate in-flight factors which might possibly affect the maximum altitude the missile might reach.

SUMMARY OF THE INVENTION

The present invention provides a switch responsive to conditions which occur when a launched missile reaches apogee. It includes a cylinder with a movable piston like weight having a cup or cage at one end in which a conductive sphere is normally locked. Prior to launch a pair of weighted arms prevent forward movement of the weight while a spring plunger resists rearward movement thereof. Upon launch the piston set back force compresses the spring and frees the weighted arms so that centrifugal force can move them out of the path of forward movement of the piston. When apogee is reached the piston moves to its full forward position uncaging the sphere which is thereupon attracted by magnetism to a contact ring which closes an electric circuit and ejects the payload.

STATEMENT OF THE OBJECTS OF INVENTION

An object of this invention is to provide an improved apogee sensing device.

Another object of the invention is to provide an apogee switch simple in design yet accurate in operation.

A further object of the invention is to provide an apogee switch will operate only at vehicular apogee.

A still further object of the invention is to provide an apogee sensing switch utilizing magnetic force to close the contacts.

Other objects, advantages, and novel features of the invention will become apparent from the following detailed description of the invention when considered in conjunction with the accompanying drawings.

BRIEF DESCRIPTION OF THE DRAWINGS

FIG. 1 is a perspective view of the exterior of a switch incorporating the present invention.

FIG. 2 is a cross-sectional view taken along the line 2—2 of FIG. 1.

FIG. 3 is a longitudinal sectional view taken along the line 3—3 of FIG. 2.

FIG. 4 is a view similar to FIG. 2 illustrating the unlocked position of the centrifugal force responsive arms.

FIG. 5 is a longitudinal sectional view taken along the line 5—5 of FIG. 4 with portions broken away.

FIG. 6 is a view similar to FIG. 5 illustrating the changed position of the piston as the vehicle reaches apogee.

FIG. 7 is a transverse sectional view taken along line 7—7 of FIG. 6.

FIG. 8 is a plan view of a magnet especially shaped to cooperate with the switch portion of the present invention.

DESCRIPTION OF THE PREFERRED EMBODIMENT

Referring now to the drawings and in particular to FIGS. 1, 2 and 3 there is illustrated the switch of the present invention with the parts in the positions they assume prior to launch. It comprises an elongate cylinder 19 which may be broadly divided into a forward arming compartment 11, a rear electric contact area 12 and an intermediate actuating weight chamber 13.

A movable actuating weight 14 is positioned within the intermediate chamber 13 and has an enlarged central portion 15 loosely fitted to the adjacent cylinder wall with forward and aft extensions 16 and 17 respectively projecting axially therefrom, each extension being reduced in diameter as compared to the central portion 15.

The forward safety arming compartment 11 includes a front closure plate 18 which is mounted on the forward end of cylinder 10. A pair of spaced parallel studs 19 and 20 are secured in stop plate 21 and extend through closure plate 18. Nuts 22 and 23 on the outer ends thereof hold the closure plate 18 in place. A pair of centrifugal force responsive arms 24 and 25 are pivotally mounted on studs 19 and 20 about which they may move from an inner, retracted position (FIG. 2) to an outer, extended position (FIG. 4). These arms are retained on their respective pivot studs by suitable keys. The arms 24 and 25 are provided with openings 26 and 27 (FIG. 4) adapted to receive the pins 28, 29 respectively and thus be locked against radial movement. When so locked they prevent forward movement of the actuating weight 15 prior to vehicular launch. Friction reducing washers 30 and 31 are located on opposite sides of each arm.

The previously mentioned stop plate 21 partitions the safety arming compartment 11 from the actuating weight chamber 13 and may be secured within cylinder 10 by pins 32. It receives the forward actuating weight extension 16 within a central opening 33. Stop plate 21 also limits forward movement of the actuating weight 15 within the chamber 13.

Within the electric contact area 12, a metal sphere 34, preferably coated with gold, is normally caged in cup shaped opening 35 having a beveled lip 36 and is held in a trapped position therein by the tip of plunger 37. This plunger rests in a central opening 38 in base assembly 39 and is maintained under pressure by a compression spring 40.

A stepped collar or sleeve 41 encloses the electric contact area 12 and the reduced forward portion thereof lies in the peripheral groove 42 of a cammed guide plate 43. As shown the guide plate 43 partitions the actuating weight chamber 13 from the electric contact area 12 and the other wall for the area 12 is formed by the base assembly insert 39. It will be noted that guide plate 43 is inclined on one side so as to provide a narrowed chamber space because of the high point 51 at the thickest part of the plate for the sphere 34 to wedge into.

The base assembly 39 has opening 38 to receive the plunger 37 and opening 44 to accommodate prong 45 of an electric connector. An insulated terminal plate 46 lies along the inside face of base assembly 39 and is provided with a central aperture 53 to receive plunger 37 and a peripheral aperture 49 each axially aligned with channels 38 and 44 respectively. A suitable contact ring 50 may be recessed into or plated upon the inner surface of terminal plate 46. A specially shaped magnet 54 (FIG. 8) is positioned between the base assembly 39 and the insulated terminal plate 46 substantially as shown in FIG. 3. It is shaped as shown in FIG. 8 as a flat disc 54 having a sector removed to leave magnet end walls 56—58. The central opening 60 in the disc has a groove or ledge 62 which receives shoulder 48 on plunger 37. This construction permits a free operative movement of plunger 37 through the aligned communicating openings 38 and 53 in the base assembly 39 and terminal plate 46 respectively. Similarly the U-shape design of magnet 54 also permits noninterference with the prong 45 of an electric connector which is positioned in communicating openings 44 and 49 in the base assembly 39 and terminal plate 46 respectively. Plunger 37 normally retains the electrically conductive sphere 34 trapped within cup 35 under pressure of compression spring 40. It will be noted that said plunger is provided with a positioning shoulder 48 which is too large to permit escape of the plunger through the central opening 53 in terminal plate 46.

Thus far, the parts have been described in the positions assumed with the vehicle at rest (FIGS. 1, 2 and 3). However, after launch the vehicle ordinarily spins about its longitudinal axis at a rate of approximately 12 RPS and, initially, a setback force is achieved which is frequently over 100 times the force of gravity. The setback force moves the actuating weight 14 and sphere 34 trapped in cup 35 in a rearward direction against plunger 37 compressing spring 40 (FIG. 5). This movement withdraws pins 28, 29 from the openings 26, 27 to free the centrifugal force responsive arms 24 and 25 which then move outwardly to the positions shown in FIG. 4 so that they no longer obstruct the forward movement of weight 14. As shown in FIG. 6, the actuating weight 14 then is free to move to the left and uncage the trapped sphere 34.

It has been determined that the trajectory of a probe such as a weather probe is for the probe vehicle to ascend vertically to substantially its point of maximum altitude at which time all vertical movement ceases. The probe, still oriented vertically, then moves laterally a substantial distance after which it starts to return backwardly. When sufficient downward velocity is achieved for the tail fins to be affected by the thin high altitude atmosphere the probe will then whip around to point its nose earthward. During the period just subsequent to the cessation of probe lateral motion the downward descent of the probe vehicle is some what retarded by the thin high altitude atmosphere, however the metal contact sphere 34, being protected, is unaffected but the drag of such atmosphere and hence descends more rapidly than the probe. This causes withdrawal of the sphere from its caged position in the cup 35 in the end of aft extension 17. Since the probe is still rotating about its longitudinal axis the sphere 34 floats out of the cup, over the inclined lip 36 and is attracted by magnet 54 to the contact ring 50 and is wedged between the high point 51 of the cammed rear wall of guide plate 43 and contact ring 50 thereby closing an electric circuit of which prong 45 is a part.

Obviously many modifications and variations of the present invention are possible in the light of the above teachings. It is therefore to be understood that within the scope of the appended claims the invention may be practiced otherwise than as specifically described.

I claim:

1. The combination with an upwardly propelled vehicle traveling a trajectory with an initial acceleration portion and a terminal inertial portion of means for activating an event initiating device only at vehicle apogee comprising:
   a first mass; said first mass being movable to actuate said initiating device when the vehicle reaches the apogee portion of its trajectory;
   a second mass; said second mass being related to said first mass so as normally to limit movement of said first mass;
   means whereby said second mass acts in response to forces occurring upon termination of the acceleration portion of said vehicle movement and releases said first mass; and
   magnetic means attracting said released first mass and thereby actuating said event initiating device.

2. The combination as specified in claim 1 in which the magnetic means is a specially shaped magnet.

3. The combination as defined in claim 2 wherein the specially shaped magnet is in the form of a flat incomplete ring having central aperture.

4. An electrical switch armed by vehicular forces occurring after launch and operative only at apogee comprising:
   a cylinder;
   a first electrical contact means located within said cylinder;
   a second electrical contact means positioned in said cylinder;
   a magnetic means positioned adjacent said first electrical contact means;
   a bridging means adapted to be attracted by said magnetic means to complete an electrical circuit between said first and second electrical contact means;
   An actuating weight means normally restraining said actuating weight against axial movement within the cylinder, and means whereby said actuating weight holds the bridging means out of contact with the first and second electrical means;
   means positioned in the cylinder causing free movement of the actuating weight within the cylinder after suitable launching forces are obtained upon reaching apogee, said movable bridging means being attracted by said magnetic means to provide a contact between the first and second electrical contact means.

5. The combination as defined in claim 4 wherein the magnetic means includes a flat magnet shaped in the form of an incomplete disc having a large central aperture.